US009214664B2

United States Patent
Oh et al.

(10) Patent No.: US 9,214,664 B2
(45) Date of Patent: Dec. 15, 2015

(54) CATHODE ACTIVE MATERIAL WITH HIGH CAPACITY AND IMPROVED CONDUCTIVITY AND NON-AQUEOUS ELECTROLYTE SECONDARY BATTERY COMPRISING THE SAME

(71) Applicant: LG CHEM, LTD., Seoul (KR)

(72) Inventors: Song Taek Oh, Daejeon (KR); Sang Uck Lee, Daejeon (KR); Geun Chang Chung, Daejeon (KR); Sin Kyu Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 173 days.

(21) Appl. No.: 13/788,865

(22) Filed: Mar. 7, 2013

(65) Prior Publication Data

US 2013/0183588 A1  Jul. 18, 2013

Related U.S. Application Data

(63) Continuation of application No. PCT/KR2011/006901, filed on Sep. 19, 2011.

(30) Foreign Application Priority Data

Sep. 20, 2010 (KR) .................. 10-2010-0092247

(51) Int. Cl.
*H01M 4/131* (2010.01)
*H01M 4/505* (2010.01)
(Continued)

(52) U.S. Cl.
CPC ........... *H01M 4/131* (2013.01); *B60L 11/1879* (2013.01); *H01M 4/505* (2013.01); *H01M 4/625* (2013.01); *B60L 2240/545* (2013.01); *Y02E 60/122* (2013.01); *Y02T 10/7005* (2013.01); *Y02T 10/705* (2013.01); *Y02T 10/7011* (2013.01)

(58) Field of Classification Search
CPC ..... H01M 4/505; H01M 4/625; H01M 4/131; H01M 4/0404; H01M 10/052; C01G 45/02; C01G 45/1242; B60L 11/1879; B60L 2240/545
See application file for complete search history.

(56) References Cited

U.S. PATENT DOCUMENTS

2001/0031391 A1\* 10/2001 Hironaka et al. ............... 429/94
2013/0183587 A1   7/2013 Uegami et al.

FOREIGN PATENT DOCUMENTS

| JP | 2000-58040 A | 2/2000 |
| JP | 2001-328813 | 11/2001 |

(Continued)

OTHER PUBLICATIONS

Yang-Kook Sun et al, "Overcoming Jahn-Teller distortion of oxysulfide spinel materials for lithium secondary batteries", Oct. 1999, Journal of Materials Chemistry, 1999, 9, 3147-3150.\*

*Primary Examiner* — Raymond Alejandro
(74) *Attorney, Agent, or Firm* — Birch, Stewart, Kolasch & Birch, LLP (57) ABSTRACT

An object of the present invention is a cathode active material including a lithium manganese-based oxide. The lithium manganese-based oxide has a spinel structure, exhibits coreshell phase transition by which phase transition of a crystal structure occurs from a cubic structure to a tetragonal structure in a direction from the surface of particles to the center of the particles during discharging to the 3V region, and includes a conductive material at the shell to improve electrical conductivity of the tetragonal structure.

16 Claims, 6 Drawing Sheets
(6 of 6 Drawing Sheet(s) Filed in Color)

(51) Int. Cl.
*H01M 4/62* (2006.01)
*B60L 11/18* (2006.01)

(56) References Cited

FOREIGN PATENT DOCUMENTS

| JP | 2002-008654 A | 1/2002 |
|---|---|---|
| JP | 2003-86174 A | 3/2003 |
| JP | 2003-308845 A | 10/2003 |
| JP | 2004-63141 A | 2/2004 |
| JP | 2007-48692 A | 2/2007 |
| JP | 2007-103339 A | 4/2007 |
| JP | 2008-34376 A | 2/2008 |
| JP | 2008-34378 A | 2/2008 |
| JP | 2008-251390 A | 10/2008 |
| KR | 10-2002-0017958 | 1/2004 |

\* cited by examiner

CATHODE ACTIVE MATERIAL WITH HIGH CAPACITY AND IMPROVED CONDUCTIVITY AND NON-AQUEOUS ELECTROLYTE SECONDARY BATTERY COMPRISING THE SAME

CROSS REFERENCE TO RELATED APPLICATIONS

This application is a Continuation of PCT International Application No. PCT/KR2011/006901 filed on Sep. 19, 2011, which claims priority under 35 U.S.C. §119(a) to Patent Application No. 10-2010-0092247 filed in the Republic of Korea on Sep. 20, 2010, all of which are hereby expressly incorporated by reference into the present application.

TECHNICAL FIELD

The present invention relates to a cathode active material including a lithium manganese-based oxide and a non-aqueous electrolyte secondary battery including the same. More specifically, the present invention relates to a cathode active material including a lithium manganese-based oxide, which has a spinel structure, exhibits core-shell phase transition by which phase transition of a crystal structure occurs from a cubic structure to a tetragonal structure in a direction from the surface of a particle to the center of the particle during discharging to a 3V region, and includes a conductive material at the shell to improve electrical conductivity of the tetragonal structure, and a non-aqueous electrolyte secondary battery including the cathode active material.

BACKGROUND ART

Recently, increased concern over environmental issues has brought about a great deal of research associated with electric vehicles (EVs) and hybrid electric vehicles (HEVs) as substitutes for vehicles using fossil fuels, such as gasoline vehicles and diesel vehicles, which are a major cause of air pollution. Although nickel metal hydride-based secondary batteries have mostly been used as power sources of such EVs, HEVs, and the like, a great deal of studies into use of lithium secondary batteries having high energy density, high discharge voltage, long cycle lifespan, and low self discharge rate is now extensively implemented and some thereof are commercially available.

In conventional lithium secondary batteries, a carbonaceous material is usually used as an anode active material and use of lithium metal, sulfur compounds, and the like is also considered. In addition, lithium-containing cobalt oxide ($LiCoO_2$) is commonly used as a cathode active material, and lithium-containing manganese oxides such as $LiMnO_2$ having a layered structure and $LiMn_2O_4$ having a spinel structure and lithium-containing nickel oxides such as $LiNiO_2$ are also used.

Among these cathode active materials, $LiCoO_2$ with long cycle lifespan and high charge-discharge efficiency is the most commonly used material. However, $LiCoO_2$ entails problems such as low structural stability and high costs for cobalt as a raw material due to limited availability of cobalt, in turn reducing price competitiveness. Accordingly, there are restrictions on use of $LiCoO_2$ in large quantities in EV applications.

Meanwhile, although $LiNiO_2$-based cathode active materials are relatively cheap and embody high discharge capacity, they exhibit rapid phase transition in a crystal structure depending upon capacity variation accompanied by charge-discharge cycle and, when exposed to air and/or moisture, encounter sharp reduction in safety.

Lithium manganese oxides such as $LiMnO_2$ and $LiMn_2O_4$ have merits of excellent thermal stability and low price but entail disadvantages such as low capacity, short cycle lifespan, and poor properties at high temperature.

Among these lithium manganese oxides, spinel $LiMn_2O_4$ shows relatively uniform potential in the 4V region (3.7 to 4.3V) and the 3V region (2.7 to 3.1V). However, it is known that cycle lifespan and storage properties of the above oxide are significantly deteriorated in the 3V region, thus causing difficulty in use thereof. This is because the above oxide is present in a single cubic phase in the 4V region due to phase transition based on Jahn-Teller distortion and is converted into a complex phase including two phases of the cubic phase and the tetragonal phase in the 3V region, and manganese is eluted into an electrolyte.

For such reasons, when a spinel lithium manganese oxide is utilized in the 3V region, real capacity of the oxide is generally lower than a theoretical capacity of the same and C-rate properties are relatively low.

Therefore, it is known that utilization of spinel lithium manganese oxides in the 3V region becomes very difficult. Some studies have reported that cycle lifespan may be increased in the 3V region by formation of a tetragonal phase and S-doping. However, such improvement is insignificant or exact reasons thereof have not been found yet.

Regarding utilization of lithium manganese oxides in the 3V region, some studies have reported a technique of increasing cycle lifespan in the 3V region by mixing a spinel lithium manganese oxide with carbon through milling. However, the present inventors have found that this technique cannot attain desired improvement in charge-discharge characteristics in the 3V region.

Therefore, there is a need to develop a technique of simply manufacturing a spinel lithium manganese oxide having high capacity and long lifespan in the 3V region.

DISCLOSURE

Technical Problem

Therefore, the present invention has been made to solve the above and other technical problems that have yet to be resolved.

As a result of a variety of extensive and intensive studies and experiments to solve the problems as described above, the present inventors developed a lithium manganese-based oxide with a spinel structure exhibiting core-shell phase transition by which phase transition of a crystal structure occurs in a direction from the surface of a particle to the center of the particle during discharging to a 3V region and including a conductive material at the shell to improve electrical conductivity of a tetragonal structure and confirmed that a cathode active material including the lithium manganese-based oxide has high capacity and long lifespan in the 3V region. The present invention has been completed, based on this discovery.

Technical Solution

In accordance with one aspect of the present invention, provided is a cathode active material including a lithium manganese-based oxide, which has a spinel structure, exhibits core-shell phase transition by which phase transition of a crystal structure occurs from a cubic structure to a tetragonal structure in a direction from the surface of a particle to the center of the particle during discharging to a 3V region, and includes a conductive material at the shell to improve electrical conductivity of the tetragonal structure.

LiMn$_2$O$_4$ with a spinel structure has a capacity of about 120 mAh/g respectively in the 4V region and in the 3V region. While capacity of spinel LiMn$_2$O$_4$ is stably expressed in the 4V region, capacity thereof is significantly reduced depending upon number of cycles. This is because the Jahn-Teller phenomenon by which phase transition occurs from the cubic structure to the tetragonal structure as oxidation number of Mn is reduced to 3 by reactions in the 3V region is caused as described above. Performance degradation due to the Jahn-Teller phenomenon is caused by various reasons, such as short-circuits with a conductive material, a binder, a current collector, and the like, due to contraction and expansion thereof. In addition, the present inventors have found that electrical conductivity of the tetragonal structure is far lower than that of the cubic structure. However, these reasons are not sufficient to describe the performance degradation.

According to the present invention, it was first confirmed that electrical conductivity of the tetragonal structure is far lower than that of the cubic structure, and phase transition occurs as a core-shell phase transition. That is, phase transition is initiated at the outer circumferential area of a LiMn$_2$O$_4$ particle with a spinel structure from a cubic structure to a tetragonal structure. Thus, the core remains in the cubic structure, and the shell has the tetragonal structure by phase transition. As a result, the LiMn$_2$O$_4$ particle has a core-shell structure. The present inventors confirmed the mechanism of capacity reduction based on the fact that the capacity may be reduced since the internal cubic spinel structure surrounded by the tetragonal structure with low electrical conductivity by the phase transition cannot be involved in reactions, or the internal cubic spinel structure may be involved in reactions not during high-efficiency discharging but during low-efficiency discharging. The present invention provides a cathode active material including a conductive material to improve electrical conductivity of the shell region with low electrical conductivity.

The lithium manganese-based oxide may be a compound represented by Formula 1 below.

$$\text{Li}_{1+x}\text{M}_y\text{Mn}_{2-x-y}\text{O}_{4-z}\text{Q}_z \quad (1)$$

In Formula 1, 0≤x≤0.3, 0≤y≤1, and 0≤z≤1, M includes at least one element selected from the group consisting of Al, Mg, Ni, Co, Fe, Cr, V, Ti, Cu, B, Ca, Zn, Zr, Nb, Mo, Sr, Sb, W, Ti, and Bi, Q includes at least one element selected from the group consisting of N, F, S and Cl. In this regard, z and y may vary according to oxidation number of M and Q and may be simply calculated based on Formula 1. For example, if Q is F with an oxidation number of −1, the number of Q may be 2z.

Electrical conductivity of the core region of the core-shell structure may be greater than electrical conductivity of Li$_2$M$_y$Mn$_{2-x-y}$O$_{4-z}$Q$_z$ (Here, y and z are as defined above with reference to Formula 1).

In general, the lithium manganese-based oxide has a structure of secondary particles formed by aggregation of a plurality of primary particles. The core-shell phase transition may occur within the primary particles or in the secondary particles formed by aggregation of a plurality of the primary particles such that phase transition occurs in the primary particles disposed at the outer circumferential area of the secondary particles to the tetragonal structure and the primary particles disposed at the core region remain in the cubic structure.

The cathode active material according to the present invention may be a complex of a lithium manganese-based oxide represented by Formula 1, a first carbonaceous material with a relatively large particle diameter, and a second carbonaceous material with a relatively small particle diameter.

In order to improve electrical conductivity of the lithium manganese-based oxide with the core-shell structure, a conductive material may be simply coated on the surface thereof, or graphite with high conductivity may be added thereto. However, these efforts are not sufficient to solve the above-mentioned problems. A spinel lithium manganese-based oxide complex including the first carbonaceous material with a relatively large particle diameter and the second carbonaceous material with a relatively small particle diameter is preferably used.

By using the complex simultaneously including two carbonaceous materials with different physical properties, the second carbonaceous material with a relatively small particle diameter is dispersed on the surface of the primary particles in the secondary particle of the spinel lithium manganese oxide. Thus, electrical conductivity of the tetragonal structure of the shell may be improved to increase participation in the reaction, and the first carbonaceous material with high conductivity and a relatively large particle diameter may be used to provide a conductive path between the secondary particles.

In an embodiment, the secondary particles may have a structure in which the second carbonaceous material is disposed between primary particles of the lithium manganese-based oxide, and the first carbonaceous material is disposed at the outer surface of the secondary particles of the lithium manganese-based oxide.

The secondary particle forms a complex with the first carbonaceous material and the second carbonaceous material during the manufacturing process thereof. Due to particle diameter difference, the second carbonaceous material is mainly disposed between the primary particles, and the first carbonaceous material is mainly disposed at the outer surface of the secondary particle. However, some of the first carbonaceous material breaks during the formation of the complex and enters a domain of the secondary particle.

In an embodiment, on the assumption that the secondary particle of the lithium manganese-based oxide is in a spherical form, the second carbonaceous material may be mainly disposed at the outer circumferential area of the secondary particle between the primary particles.

Although high conductivity may be obtained when the second carbonaceous material is uniformly dispersed in the secondary particles, this structure cannot be easily synthesized. As the content of the second carbonaceous material increases in order to improve uniformity thereof, the content of the spinel lithium manganese oxide involved in charge and discharge is reduced, resulting in decrease in energy density. Thus, since the core-shell phase transition occurs, the structure in which the secondary carbonaceous material is disposed between the primary particles at the outer circumferential area of the secondary particle is efficient and preferable.

Specifically, the second carbonaceous material may be disposed between primary particles at a position between 0.3 r to 1 r from the center of the secondary particle with respect to the radius (r) of the secondary particle. Preferably, the second carbonaceous material may be disposed between the primary particles at a position between 0.5 r to 1 r from the center of the secondary particle with respect to the radius (r) of the secondary particle.

As described above, since the phase transition occurs at the outer circumferential area (shell) of the lithium manganese-based oxide into the tetragonal structure with low electrical conductivity to surround the cubic structure with high electrical conductivity as described above, the second carbonaceous material, as a conductive material, may be disposed between the primary particles of the lithium manganese-based oxide at the outer circumferential area.

In order to dispose the first and second carbonaceous materials as described above, in an embodiment, the first carbonaceous material may have an average particle diameter of 0.3 µm to 30 µm, and the second carbonaceous material may have a smaller average particle diameter than that of the first carbonaceous material, for example, an average particle diameter of 10 to 500 nm.

In addition, if the content of the carbonaceous material is too small, the effect of adding the carbonaceous materials is insignificant. On the other hand, if the content of the carbonaceous materials is too large, the content of the active material is relatively low, resulting in reduced capacity. Thus, the content of the first carbonaceous material may be in the range of 1 to 15% by weight based on the total weight of the cathode active material, and the content of the second carbonaceous material may be in the range of 1 to 15% by weight based on the total weight of the cathode active material. The total content of the first carbonaceous material and the second carbonaceous material may be in the range of 2 to 20% by weight based on the total weight of the cathode active material. Preferably, the content of the first carbonaceous material may be in the range of 1 to 10% by weight, the content of the second carbonaceous material may be in the range of 1 to 10% by weight, and the total content of the first carbonaceous material and the second carbonaceous material may be in the range of 2 to 15% by weight.

The complex may be formed by various methods. For example, at least one method selected from the group consisting of: a method of simultaneously pulverizing the spinel lithium manganese-based oxide and forming a complex of the lithium manganese-based oxide, the first carbonaceous material, and the second carbonaceous material such as high energy milling and wet milling; and a method of forming a complex thereof without using pulverization such as mechano-fusion and hybridization may be used, but the method is not limited thereto. Any other methods used to form a complex may be applied thereto.

In order to disperse the carbonaceous material between the primary particles, a complex may be formed by high energy milling instead of simple milling.

In an embodiment, the complex may be formed by adding the first carbonaceous material and the second carbonaceous material or precursors thereof during calcining the spinel lithium manganese-based oxide and performing a synthesis process.

Specifically, the complex may be formed by adding the first carbonaceous material and the second carbonaceous material or precursors thereof to a lithium compound (lithium source) and a manganese compound (manganese source) which are used to synthesize a spinel lithium manganese-based oxide, calcining the mixture, and performing solid reaction of the calcined mixture.

The lithium source may include at least one selected from the group consisting of $Li_2CO_3$ and LiOH, and the manganese source may include at least one selected from the group consisting of $MnO_2$, MnOOH, and $Mn_3O_4$.

The carbonaceous materials are not particularly limited so long as they have excellent electrical conductivity and do not cause side reaction in the inner environment of the lithium secondary battery and may be any carbon-based material with high electrical conductivity. Examples of the highly conductive first carbonaceous material include natural graphite, artificial graphite, and the like with an average particle diameter of 0.3 µm to 30 µm. Examples of the second carbonaceous material include Denka black, channel black, furnace black, Ketjen black, carbon black, and the like with an average particle of 10 to 500 nm which is smaller than that of the first carbonaceous material. If required, a polymer with high conductivity may also be used.

In the cathode active material, (440) planes are predominantly formed in a crystal structure to provide high lithium ion diffusivity.

In general, in a crystal structure, planes are enclosed in parentheses "( )". In this regard, a reciprocal of a point of the plane contacting the x-, y-, and z-axes is indicated in parentheses "( )". That is, a contact point of a plane perpendicular to the x-axis with each axis is (1∞∞), and a reciprocal thereof is 100. Thus, for example, a (440) plane is perpendicular to the x and y axes and contact points with each of the axes are (¼, ¼∞).

Meanwhile, in a crystal structure, crystal directions are indicated using brackets "[ ]". In this regard, directions corresponding to x, y, and z axes (or a, b, and c directions) are represented by [100], [010], and [001] directions. That is, a plane perpendicular to the [100] direction is a (100) plane.

Lithium ion diffusivity plays an important role in C-rate and capacity properties of lithium secondary batteries. In a lithium secondary battery, as C-rate properties are improved, charge-discharge time may be reduced, and as capacity is improved, utilization of lithium ions in a cathode active material may be improved.

In the cathode active material according to the present invention, (440) planes suitable for lithium ion diffusion are predominantly formed in comparison with (111) planes unsuitable for the lithium ion diffusion. Thus, C-rate and capacity properties of lithium secondary batteries may be improved. Since the (111) planes are more stable than the (440) planes, more (1110) planes are formed on the surface. However, the (440) planes, which are relatively unstable but suitable for lithium ion diffusion, may be predominantly formed by high energy milling or calcination.

The cathode active material according to the present invention may further include other active materials in addition to the spinel lithium manganese-based oxide. In this case, the spinel lithium manganese-based oxide may be contained in an amount of 30 to 100%, preferably 50 to 100%, based on the total weight of the cathode active material. Here, other active materials may include a variety of active materials known in the art such as lithium cobalt oxide, lithium nickel oxide, lithium cobalt-manganese oxide, lithium nickel-manganese oxide, lithium cobalt-nickel oxide, lithium cobalt-manganese-nickel oxide, and oxides having other elements substituted or doped thereon.

The present invention also provides a cathode material including the foregoing cathode active material.

The cathode material may optionally include a binder, a filler, and the like, in addition to the cathode active material.

The binder assists in combination of an active material with a conductive material and bonding to a current collector and is normally added in an amount of 1 to 30 wt % based on the total weight of a mixture containing the cathode active material. Examples of the binder include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluorinated rubber, and various copolymers.

The filler is a supplementary ingredient to inhibit electrode expansion, is optionally used and is not particularly restricted so long as it includes fibrous materials without causing chemical modification of the battery. The filler may include, for example, olefin polymers such as polyethylene and polypropylene and fibrous materials such as glass fiber or carbon fiber.

According to the present invention, a conductive material need not be added to the cathode material since the first carbonaceous material and the second carbonaceous material contained in the cathode active material provide conductivity. However, addition of the conductive material is also within the scope of the present invention. Examples of the conductive material will be described later with reference to an anode.

The present invention also provides a cathode for a secondary battery, which includes the foregoing cathode material applied to a current collector.

The cathode for a secondary battery may be fabricated by, for example, mixing the cathode material in a solvent such as NMP to prepare a slurry, applying the slurry to an anode collector and drying and rolling the coated current collector.

The cathode current collector described above is generally fabricated to have a thickness in the range of 3 to 500 µm. Such cathode current collector is not particularly restricted so long as it has high conductivity without causing chemical modification of the battery. For example, the cathode current collector may be fabricated using stainless steel, aluminum, nickel, titanium, calcined carbon, or stainless steel or aluminum surface-treated with carbon, nickel, titanium or silver, and the like. The current collector may be processed to have fine irregularities on the surface thereof, so as to enhance adhesion to the cathode active material. In addition, the current collector may have various forms including films, sheets, foils, nets, porous structures, foams, non-woven fabrics, and the like.

The present invention also provides a lithium secondary battery including the cathode described above, an anode, a separator, and a non-aqueous electrolyte containing lithium salts. The lithium secondary battery according to the present invention exhibits excellent capacity and long cycle lifespan in the range of 2.5 to 4.5V, which is the 3V region, as well as in the 4V region.

The anode used herein is fabricated by, for example, applying an anode material containing an anode active material to an anode current collector, and then drying the coated collector. In this case, the anode material may optionally include the foregoing components.

Examples of the anode active material include: carbon-graphite materials such as natural graphite, artificial graphite, expanded graphite, carbon fiber, non-graphitizing carbon, carbon black, carbon nanotubes, fullerene, and activated carbon; metals alloyable with lithium such as Al, Si, Sn, Ag, Bi, Mg, Zn, In, Ge, Pb, Pd, Pt, and Ti and compounds including these elements; complexes of the metal and compounds thereof with the carbon-graphite materials; and lithium-containing nitrides. Among these, carbon-based active materials, silicon-based active materials, tin-based active materials, or silicon-carbon-based active materials may be used alone or in combination of at least two thereof.

The anode material may further include a conductive material. In this regard, the conductive material may be added in an amount of 1 to 30 wt % based on the total weight of a mixture containing the cathode active material. Such conductive material is not particularly restricted so long as it has conductive properties without causing chemical modification of the battery. The conductive material may include, for example: graphite such as natural graphite or artificial graphite; carbon black such as acetylene black, Ketjen black, channel black, furnace black, lamp black, and thermal black; conductive fibers such as carbon fiber or metal fiber; metal powder such as carbon fluoride powder, aluminum powder, and nickel powder; conductive whiskers such as zinc oxide, potassium titanate, etc.; conductive metal oxides such as titanium oxide; and conductive substances such as polyphenylene derivatives.

The anode current collector is generally fabricated to have a thickness in the range of 3 to 500 µm. Such anode current collector is not particularly restricted so long as it has favorable conductivity without causing chemical modification of the battery. For example, the anode current collector may be fabricated using copper, stainless steel, aluminum, nickel, titanium, calcined carbon, copper or stainless steel surface-treated with carbon, nickel, titanium or silver, aluminum-cadmium alloy, and the like. Similar to the cathode current collector, the anode current collector may be processed to have fine irregularities on the surface thereof, so as to enhance adhesion to the anode active material. In addition, the anode current collector may have various forms including films, sheets, foils, nets, porous structures, foams, non-woven fabrics, and the like.

The separator used herein is interposed between the cathode and the anode and may be formed using a thin insulation film having high ion permeability and excellent mechanical strength. The separator typically has a pore diameter of 0.01 to 10 µm and a thickness of 5 to 300 µm. As the separator, a sheet or non-woven fabric made of olefin polymers such as polypropylene and polyethylene or glass fibers which have chemical resistance and hydrophobicity may be used. When a solid electrolyte including polymer is employed as the electrolyte, the solid electrolyte may also serve as the separator.

The non-aqueous electrolyte containing lithium salt used herein includes an electrolyte and a lithium salt. The electrolyte may be a non-aqueous organic solvent, an organic solid electrolyte, an inorganic solid electrolyte, or the like.

The non-aqueous organic solvent may be an aprotic organic solvent including, for example, N-methyl-2-pyrrolidone, propylene carbonate, ethylene carbonate, butylene carbonate, dimethyl carbonate, diethyl carbonate, γ-butyrolactone, 1,2-dimethoxyethane, tetrahydroxy franc, 2-methyl tetrahydrofuran, dimethyl sulfoxide, 1,3-dioxolane, formamide, dimethyl formamide, dioxolane, acetonitrile, nitromethane, methyl formate, methyl acetate, phosphoric triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric ester polymers, poly agitation lysine, polyester sulfide, polyvinyl alcohol, polyvinylidene fluoride, and polymers containing ionic dissociation groups.

Examples of the inorganic solid electrolyte include nitrides, halides, and sulfates of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$NiOH$, and $Li_3PO_4$—$Li_2S$—$SiS_2$.

The lithium salt used herein is a material readily soluble in the non-aqueous electrolyte and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, low aliphatic carboxylic acid lithium, lithium tetraphenyl borate, and imides.

In addition, the non-aqueous electrolyte may further include pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like in order to improve charge-discharge properties and flame retardancy. If necessary, in order to impart non-flammability, the non-aqueous electrolyte may further include halogen-containing solvents such as carbon tetrachloride and ethylene trifluoride. The non-aqueous electrolyte may further include carbon dioxide gas, fluoro-ethylene carbonate (FEC), or propene sultone (PRS) in order to improve high-temperature storage characteristics.

The secondary battery fabricated according to the present invention may be employed in a battery cell that is used as a power source of a small device and, in addition, is preferably used as a unit cell for medium and/or large-scale battery modules having a number of battery cells.

Preferred examples of medium and large-scale devices include electric vehicles, hybrid electric vehicles, plug-in hybrid electric vehicles, and power storage systems, without being particularly limited thereto.

BRIEF DESCRIPTION OF THE DRAWINGS

The patent or application file contains at least one color drawing. Copies of this patent or patent application publication with color drawing will be provided by the USPTO upon request and payment of the necessary fee.

The above and other objects, features and other advantages of the present invention will be more clearly understood from the following detailed description taken in conjunction with the accompanying drawings, in which.

BEST MODE

Now, the present invention will be described in more detail with reference to the accompanying drawings.

Figure 1:
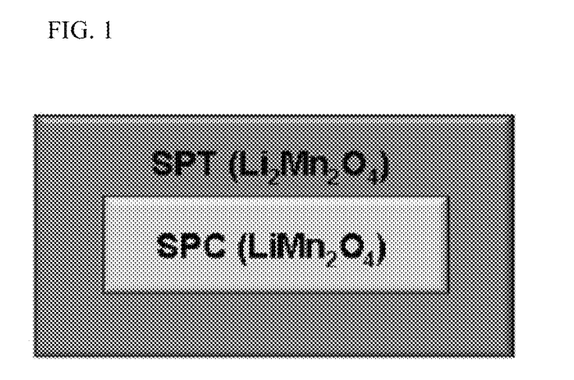
FIG. 1 is a schematic diagram illustrating a lithium manganese-based oxide in which phase transition occurs to form a core-shell structure.

Referring to FIG. 1, SPT refers to a spinel lithium manganese-based oxide with a tetragonal structure, and SPC refers to a spinel lithium manganese-based oxide with a cubic structure. FIG. 1 shows a cross-sectional view of a three-dimensional shape of the spinel lithium manganese-based oxide. Phase transition occurs in the outer circumferential area (shell) to form SPT, and the internal core area remains as SPC.

A reaction of "$LiMn_2O_4 \longleftrightarrow Mn_2O_4 + Li^+ + e^-$" occurs in the 4V region, and a reaction of "$Li_2Mn_2O_4 \longleftrightarrow LiMn_2O_4 + Li^+ + e^-$" occurs in the 3V region. In this regard, phase transition occurs into the tetragonal structure while receiving lithium ions. Phase transition is initiated at the outermost portion of the particle and proceeds into the center. The tetragonal structure has low electrical conductivity. Thus, if phase transition partially occurs, the internal regions cannot participate in reaction although the phase transition does not occur in the center.

Figure 2:
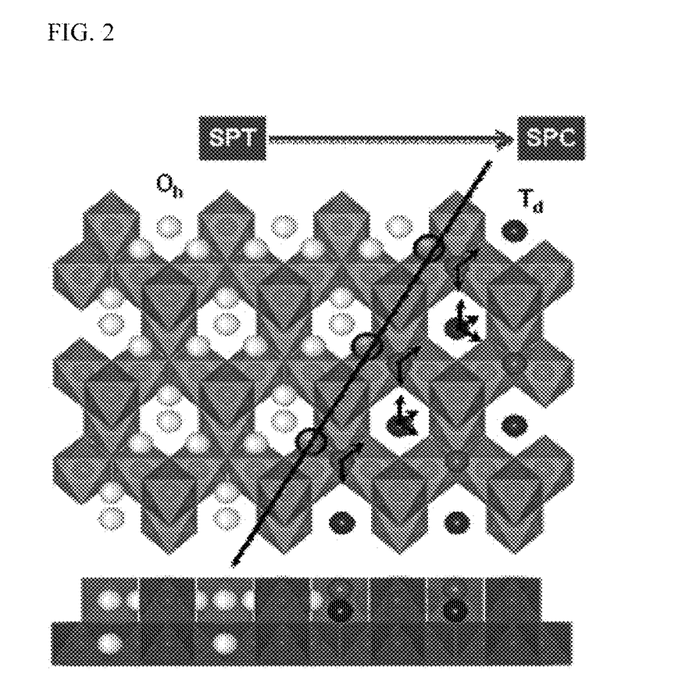
FIG. 2 is a schematic diagram illustrating phase transition of a lithium manganese-based oxide from a cubic structure to a tetragonal structure.
Figure 3:
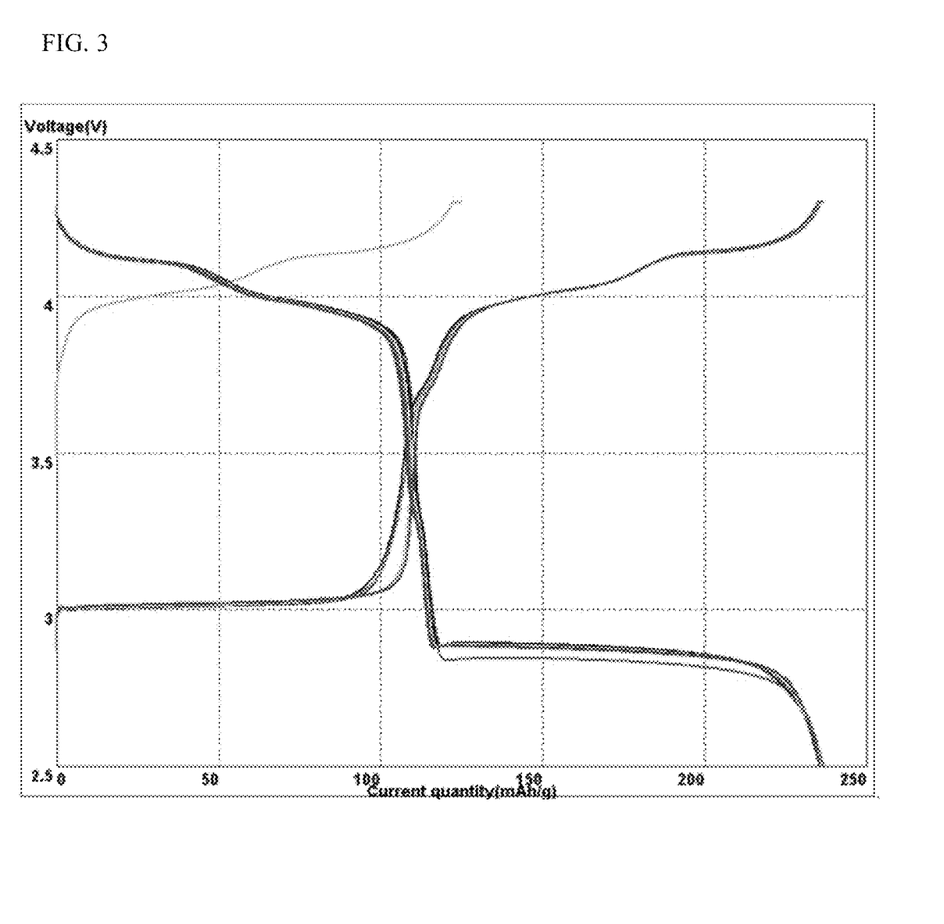
FIG. 3 is a graph illustrating a voltage-current profile of a battery including an active material prepared in Example 1 depending upon number of cycles.
Figure 4:
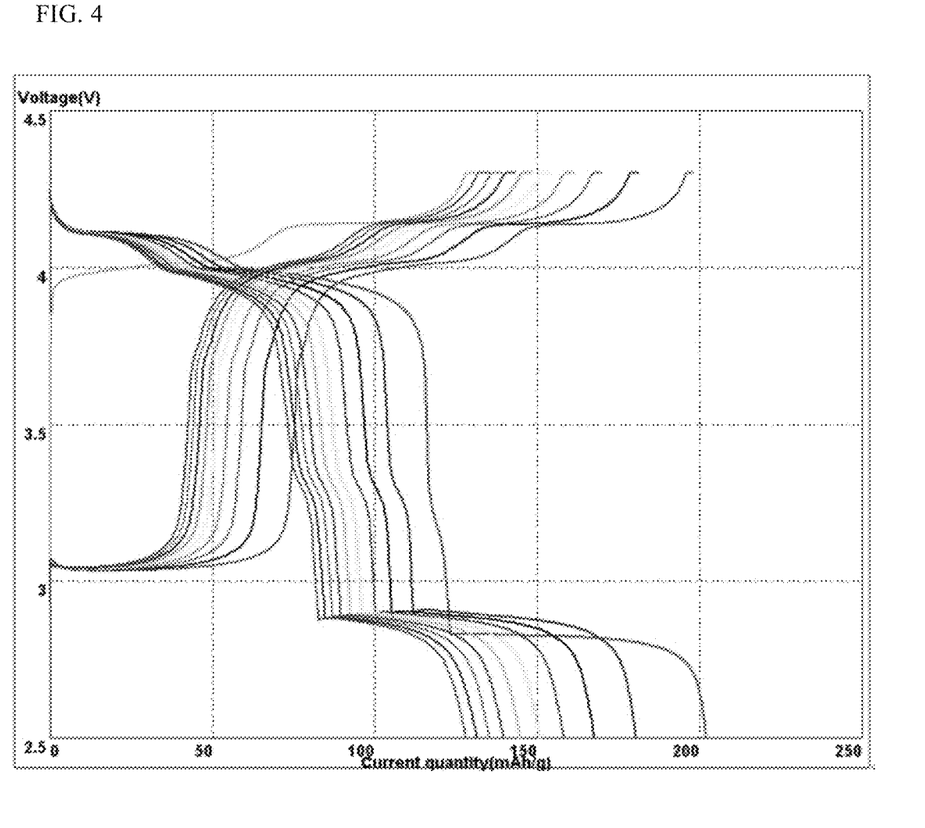
FIG. 4 is a graph illustrating a voltage-current profile of a battery including an active material prepared in Comparative Example 1 depending upon number of cycles.
Figure 5:
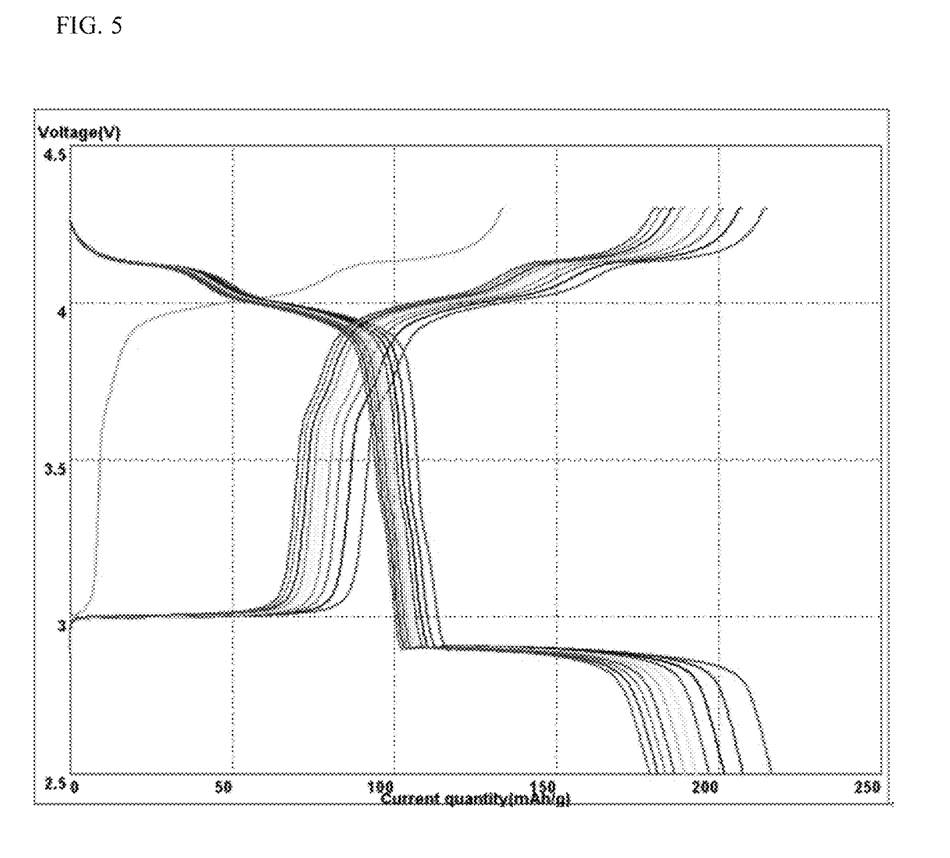
FIG. 5 is a graph illustrating a voltage-current profile of a battery including an active material prepared in Comparative Example 2 depending upon number of cycles.
Figure 6:
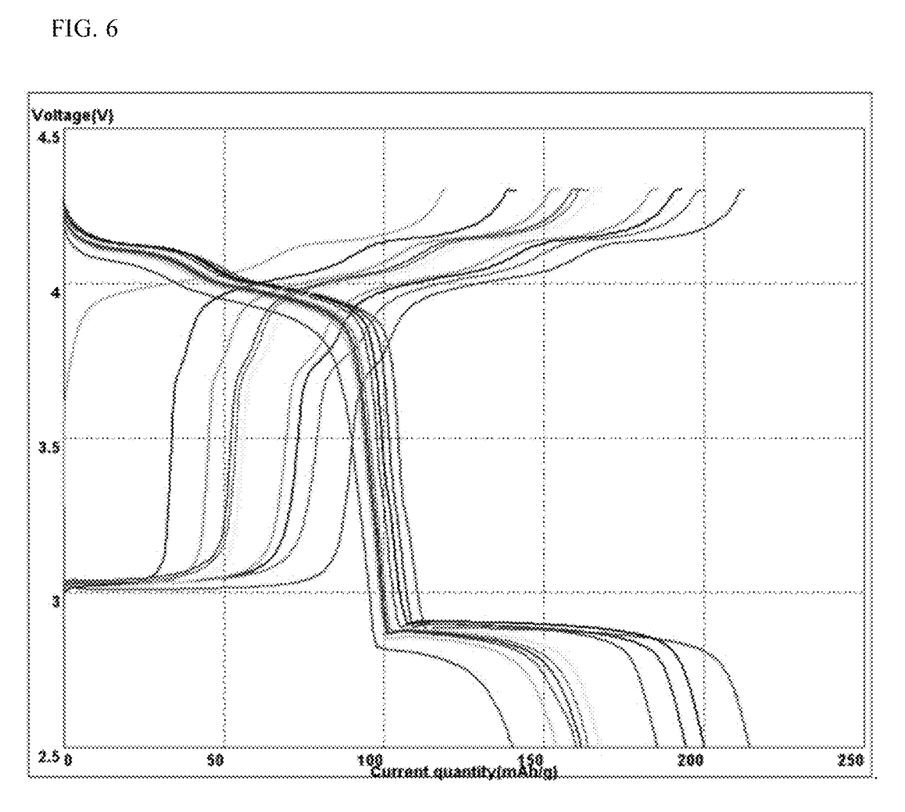
FIG. 6 is a graph illustrating a voltage-current profile of a battery including an active material prepared in Comparative Example 3 depending upon number of cycles.

Referring to FIG. 2, Oh refers to Li disposed at an octahedral position, and Td refers to Li disposed at a tetrahedral position. Li is Oh in the SPT, and Li is Td in the SPC. In addition, lithium in separate phases is more stable lithium in a mixed phase between the tetrahedral position and the octahedral position. Thus, phase transition occurs from the outermost position of the particle into the center to form a core-shell structure.

Now, the present invention will be described in more detail with reference to the following examples. These examples are provided only for illustration of the present invention and should not be construed as limiting the scope and spirit of the present invention.

Example 1

$Li_2CO_3$ and $MnO_2$ were mixed at an equivalent ratio, and the mixture was calcined at 800° C. to prepare a lithium manganese-based oxide. Then, 80% by weight of the lithium manganese-based oxide, 7% by weight of graphite, and 7% by weight of Denka black were mixed by spex-milling to prepare a complex. The complex was mixed with 6% by weight of polyvinylidene fluoride (PVDF) in N-methyl-pyrrolidone (NMP), as a solvent, to prepare an active material slurry.

Comparative Example 1

An active material slurry was prepared in the same manner as in Example 1, except that spex milling was not performed.

Comparative Example 2

$Li_2CO_3$ and $MnO_2$ were mixed at an equivalent ratio, and the mixture was calcined at 800° C. to prepare a lithium manganese-based oxide. Then, the lithium manganese-based oxide was spex-milled, and 80% by weight of the spex-milled lithium manganese-based oxide, 7% by weight of graphite, 7% by weight of Denka black, and 6% by weight of PVDF were mixed in NMP, as a solvent, to prepare an active material slurry.

Comparative Example 3

$Li_2CO_3$ and $MnO_2$ were mixed at an equivalent ratio, and the mixture was calcined at 800° C. to prepare a lithium manganese-based oxide. Then, 80% by weight of the lithium manganese-based oxide, 14% by weight of dispersed Denka black, and 6% by weight of PVDF were mixed in NMP, as a solvent, to prepare an active material slurry.

Experimental Example

Coin type half cells of lithium secondary batteries each including a cathode including each of the cathode active material slurries respectively prepared in Example 1 and Comparative Examples 1 to 3, a lithium anode, a porous polyethylene separator, and a lithium salt-containing non-aqueous electrolyte were fabricated.

The fabricated half cells were subjected to repeated charge/discharge at 0.1 C in a range of 2.5 to 4.3 V to determine variation in capacities depending upon number of cycles. The results are shown in FIG. 7.

Figure 7:
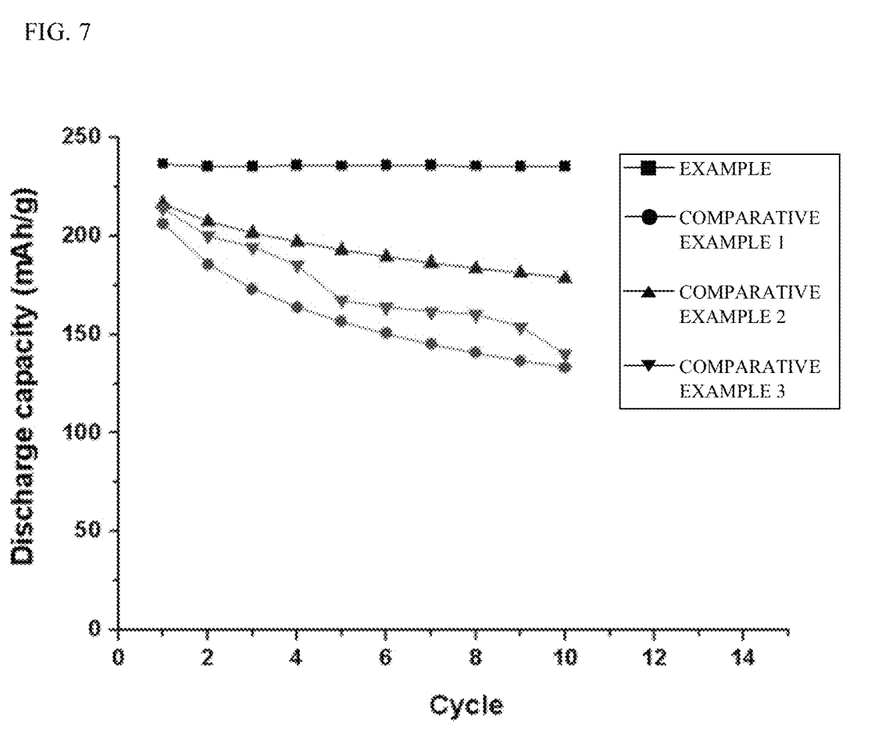
FIG. 7 is a graph illustrating discharge capacity of batteries depending upon number of cycles according to Experimental Example 1.

Referring to FIG. 7, discharge capacity of the battery fabricated using the active material prepared in Example 1 was not reduced as charge and discharge were repeated. However, the batteries fabricated using the active materials prepared in Comparative Examples 1 to 3 exhibited lower initial capacity than that of the battery fabricated using the active material prepared in Example 1 and exhibited significant reduction in discharge capacity as charge and discharge were repeated.

INDUSTRIAL APPLICABILITY

As apparent from the foregoing description, the cathode active material according to the present invention exhibits high capacity and long lifespan, and a lithium secondary battery with excellent performance may be fabricated using the cathode active material.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cathode active material comprising a lithium manganese-based oxide,
   wherein the lithium manganese-based oxide has a spinel structure, exhibits core-shell phase transition by which phase transition of a crystal structure occurs from a cubic structure to a tetragonal structure in a direction from the surface of particles to the center of the particles during discharging to the 3V region, and comprises a conductive material at the shell,
   wherein the cathode active material is a complex of the lithium manganese-based oxide and the conductive material which includes a first carbonaceous material and a second carbonaceous material,
   wherein the cathode active material is formed by mixing the spinel lithium manganese-based oxide with the first carbonaceous material and the second carbonaceous material by high energy milling, and
   wherein the first carbonaceous material has a particle diameter of 0.3 μm to 30 μm, and the second carbonaceous material has a article diameter of 10 nm to 500 nm in a rang e smaller than the particle diameter of the first carbonaceous material, wherein the lithium manganese-based oxide is formed by calcining a lithium compound and a manganese compound, wherein the lithium compound is at least one selected from the group consisting of $Li_2CO_3$ and LiOH and the manganese compound is at least one selected from the group consisting of $MnO_2$, MnOOH and $Mn_3O_4$.

2. The cathode active material according to claim 1, wherein the lithium manganese-based oxide is represented by Formula 1 below:

$$Li_{1+x}M_yMn_{2-x-y}O_{4-z}Q_x \qquad (1)$$

wherein $0 \leq x \leq 0.3$, $0 \leq y \leq 1$, and $0 \leq z \leq 1$, M comprises at least one element selected from the group consisting of Al, Mg, Ni, Co, Fe, Cr, V, Ti, Cu, B, Ca, Zn, Zr, Nb, Mo, Sr, Sb, W, Ti, and Bi, and Q comprises at least one element selected from the group consisting of N, F, S, and Cl.

3. The cathode active material according to claim 1, wherein electrical conductivity of the core is greater than electrical conductivity of $Li_2M_yMn_{2-y}O_{4-z}Q_z$, wherein $0 \leq y \leq 1$ and $0 \leq z \leq 1$.

4. The cathode active material according to claim 1, wherein the lithium manganese-based oxide has a structure of primary particles or secondary particles formed by aggregation of a plurality of primary particles.

5. The cathode active material according to claim 4, wherein the secondary particle has a structure in which a second carbonaceous material is disposed between the primary particles of the lithium manganese-based oxide, and a first carbonaceous material is disposed at the outer surface of the secondary particle of the lithium manganese-based oxide.

6. The cathode active material according to claim 5, wherein the second carbonaceous material is mainly disposed between the primary particles at an outer circumferential area of the secondary particle when the secondary particle of the lithium manganese-based oxide is in a spherical form.

7. The cathode active material according to claim 6, wherein the second carbonaceous material is disposed between the primary particles at a position between 0.3r to 1r from the center of the secondary particle with respect to a radius (r) of the secondary particle.

8. The cathode active material according to claim 1, wherein the content of the first carbonaceous material is in the range of 1 to 15 wt %, the content of the second carbonaceous material is in the range of 1 to 15 wt %, and a total weight of the first and second carbonaceous materials is in the range of 2 to 20 wt %, on the basis of the total weight of the cathode active material, respectively.

9. The cathode active material according to claim 1, wherein the first carbonaceous material comprises at least one selected from the group consisting of natural graphite and artificial graphite, and the second carbonaceous material comprises at least one selected from the group consisting of denka black, channel black, furnace black, ketjen black, and carbon black.

10. The cathode active material according to claim 1, wherein (440) planes are predominantly formed in a crystal structure.

11. A cathode material comprising a cathode active material according to claim 1.

12. A cathode for a secondary battery prepared by coating the cathode material according to claim 11 on a current collector.

13. A lithium secondary battery comprising the cathode for a secondary battery according to claim 12.

14. The lithium secondary battery according to claim 13, wherein the lithium secondary battery is used as a unit cell for battery modules that are power sources for medium and large-scale devices.

15. The lithium secondary battery according to claim 14, wherein the medium and large-scale devices comprise electric vehicles, hybrid electric vehicles, plug-in hybrid electric vehicles, or power storage systems.

16. The cathode active material according to claim 1, wherein the high energy milling is spex milling.